United States Patent
Kleinfeld

(10) Patent No.: US 8,776,504 B2
(45) Date of Patent: Jul. 15, 2014

(54) BYPASS FLUID SYSTEM FOR EXHAUST AFTERTREATMENT

(75) Inventor: Christopher J. Kleinfeld, Olivet, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 225 days.

(21) Appl. No.: 13/171,947

(22) Filed: Jun. 29, 2011

(65) Prior Publication Data

US 2011/0252788 A1    Oct. 20, 2011

Related U.S. Application Data

(63) Continuation of application No. 12/041,943, filed on Mar. 4, 2008, now Pat. No. 7,980,061.

(51) Int. Cl.
*F01N 3/00* (2006.01)

(52) U.S. Cl.
USPC ............ 60/295; 60/286; 60/280; 60/311

(58) Field of Classification Search
USPC ............ 60/280, 286, 289, 293, 295, 303, 307
See application file for complete search history.

(56) References Cited

U.S. PATENT DOCUMENTS

| 4,677,823 | A | * | 7/1987 | Hardy | ............................... | 60/274 |
| 4,840,028 | A | * | 6/1989 | Kusuda et al. | ................... | 60/303 |
| 5,067,320 | A | * | 11/1991 | Kanesaki | ........................ | 60/297 |
| 5,090,200 | A | | 2/1992 | Arai | | |
| 5,390,488 | A | | 2/1995 | Ament et al. | | |
| 5,417,059 | A | * | 5/1995 | Hartel et al. | ..................... | 60/276 |
| 5,460,784 | A | | 10/1995 | Gillbrand et al. | | |
| 5,570,576 | A | * | 11/1996 | Ament et al. | ................... | 60/300 |
| 5,617,720 | A | * | 4/1997 | Achleitner et al. | ............. | 60/274 |
| 5,771,686 | A | * | 6/1998 | Pischinger et al. | ............. | 60/274 |

(Continued)

FOREIGN PATENT DOCUMENTS

| JP | 64-069710 | 3/1989 |
| JP | 01-100310 | 4/1989 |

(Continued)

OTHER PUBLICATIONS

Machine Translation of JP-19166014, Machine Translated on Dec. 13, 2013.*

(Continued)

*Primary Examiner* — Thomas Denion
*Assistant Examiner* — Patrick Maines
(74) *Attorney, Agent, or Firm* — Harness, Dickey & Pierce, P.L.C.

(57) ABSTRACT

An exhaust treatment system for a vehicle includes an intake conduit adapted to receive pressurized intake air provided from a turbocharger compressor and supply the pressurized intake air to an internal combustion engine. An uninterrupted bypass conduit bypasses the internal combustion engine and includes upstream and downstream ends. The upstream end branches from the intake conduit. An exhaust conduit includes an upstream end adapted to receive exhaust from the internal combustion engine. An upstream end of a mixing tube is fixed to and in fluid communication with a downstream end of the exhaust conduit and the downstream end of the bypass conduit at a tubular joint, wherein the exhaust and the pressurized intake air are mixed within the mixing tube. An exhaust treatment device is in fluid communication with a downstream end of the mixing tube.

4 Claims, 3 Drawing Sheets

(56) References Cited

U.S. PATENT DOCUMENTS

| | | | |
|---|---|---|---|
| 5,829,248 | A | 11/1998 | Clifton |
| 5,974,789 | A * | 11/1999 | Mathes et al. ............... 60/274 |
| 6,167,698 | B1 * | 1/2001 | King et al. ................... 60/286 |
| 6,354,084 | B1 | 3/2002 | McKinley et al. |
| 6,637,204 | B2 * | 10/2003 | Ellmer et al. ................. 60/606 |
| 7,040,088 | B2 * | 5/2006 | Covit ............................ 60/300 |
| 7,086,222 | B2 | 8/2006 | Itoh et al. |
| 7,093,427 | B2 | 8/2006 | van Nieuwstadt et al. |
| 7,118,613 | B2 | 10/2006 | Crawley et al. |
| 7,481,048 | B2 | 1/2009 | Harmon et al. |
| 7,673,447 | B2 * | 3/2010 | Gaiser ........................... 60/289 |
| 7,793,495 | B2 * | 9/2010 | Bradley et al. ............... 60/324 |
| 8,091,346 | B2 * | 1/2012 | Kapparos et al. ............. 60/295 |
| 8,099,953 | B2 * | 1/2012 | DeHart .......................... 60/320 |
| 2003/0213243 | A1 | 11/2003 | Pierpont |
| 2003/0230074 | A1 | 12/2003 | Huang et al. |
| 2004/0244782 | A1 * | 12/2004 | Lewallen ................... 123/568.12 |
| 2005/0000209 | A1 * | 1/2005 | Takahashi et al. ............ 60/286 |
| 2005/0103013 | A1 | 5/2005 | Brookshire et al. |
| 2005/0109029 | A1 * | 5/2005 | Busch ........................ 60/605.1 |
| 2005/0217267 | A1 * | 10/2005 | Tsuzuki et al. ................ 60/606 |
| 2006/0179821 | A1 | 8/2006 | Zhan et al. |
| 2006/0234174 | A1 * | 10/2006 | Burrahm et al. ................. 431/5 |
| 2006/0242946 | A1 * | 11/2006 | Taylor et al. .................. 60/279 |
| 2007/0137177 | A1 | 6/2007 | Kittelson et al. |
| 2007/0169469 | A1 | 7/2007 | Knitt |
| 2008/0028754 | A1 | 2/2008 | Tumati et al. |
| 2008/0264042 | A1 | 10/2008 | Khadiya |
| 2008/0271447 | A1 * | 11/2008 | Abel et al. .................... 60/598 |
| 2009/0100826 | A1 * | 4/2009 | Stewart et al. ................ 60/295 |
| 2009/0193794 | A1 | 8/2009 | Robel et al. |
| 2009/0223205 | A1 * | 9/2009 | Grissom et al. ............... 60/280 |
| 2010/0126151 | A1 | 5/2010 | Andersson et al. |
| 2010/0205944 | A1 | 8/2010 | Torisaka et al. |
| 2011/0000190 | A1 | 1/2011 | Svensson et al. |
| 2013/0008150 | A1 * | 1/2013 | Muramatsu ................... 60/274 |

FOREIGN PATENT DOCUMENTS

| | | | | |
|---|---|---|---|---|
| JP | 01100310 A | * | 4/1989 | ............... F01N 3/02 |
| JP | 09166014 A | * | 6/1997 | ............... F01N 3/08 |
| JP | 10-54251 | | 2/1998 | |
| JP | 2001-090616 | | 4/2001 | |
| JP | 2007-024010 | | 2/2007 | |
| JP | 2007-285242 A | | 11/2007 | |
| JP | 2007285242 A | * | 11/2007 | |
| JP | 2008-002319 | | 1/2008 | |
| WO | WO 2009081233 A1 | * | 7/2009 | ............ F02B 37/013 |

OTHER PUBLICATIONS

Machine Translation of JP-2007285242, Machine Translated on Dec. 13, 2013.*

* cited by examiner

BYPASS FLUID SYSTEM FOR EXHAUST AFTERTREATMENT

CROSS-REFERENCE TO RELATED APPLICATIONS

This application is a continuation of U.S. patent application Ser. No. 12/041,943 filed on Mar. 4, 2008. The entire disclosure of the above application is incorporated herein by reference.

FIELD

The present disclosure relates to an exhaust system and, more particularly, relates to a charged air bypass for an aftertreatment combustion air supply.

BACKGROUND

The statements in this section merely provide background information related to the present disclosure and may not constitute prior art.

Vehicles can include aftertreatment devices for treating exhaust produced by an internal combustion engine. For instance, many vehicles include a diesel particulate filter that collects materials (e.g., soot) from the exhaust stream before being emitted from the vehicle, and these vehicles often include a burner that ignites injected fuel in order to reduce the collected materials. Also, some vehicles include a hydrocarbon injector (e.g., flame reformer, urea injector) that injects hydrocarbons into the exhaust stream in order to reduce undesirable substances, such as NOx, before the exhaust stream is emitted from the vehicle.

These aftertreatment devices typically receive air from an air supply in order to function. For instance, burners receive air that is used to ignite fuel for reducing materials collected by an associated particulate filter. In most conventional systems, a pump is used to supply air to the aftertreatment device. This pump can be driven by the engine, or the pump can be independently driven.

These conventional aftertreatment air supply systems can be relatively complex and can include a substantial number of components. Furthermore, the components can take up a substantial amount of space and can, therefore, be difficult to integrate into the vehicle. Additionally, these conventional air supply systems can cause parasitic losses to the engine system, which can reduce the efficiency of the engine system.

SUMMARY

An engine system for a vehicle is disclosed. The vehicle includes an internal combustion engine, an intake fluid system that receives an intake fluid stream, and an exhaust fluid system that receives an exhaust stream from the engine. The vehicle also includes a turbocharger device including a compressor member that supplies a compressed fluid stream to the internal combustion engine and an energy supply member actuated by the exhaust stream. The vehicle further includes an aftertreatment device in operative communication with the exhaust stream to treat the exhaust stream. The engine system has a bypass fluid system that bypasses the internal combustion engine and includes an upstream end and a downstream end. The upstream end receives a portion of the compressed fluid stream from the compressor member, and the downstream end is in fluid communication with the exhaust fluid system downstream from the energy supply member. The bypass fluid system supplies the portion of the compressed fluid stream to the aftertreatment device.

In another aspect, an engine system for a vehicle is disclosed. The engine system includes an internal combustion engine and an intake fluid system that receives an intake fluid stream. The engine system further includes an exhaust fluid system that receives an exhaust stream from the engine. Furthermore, the engine system includes a turbocharger device including a compressor member in operative communication with the intake fluid stream and an energy supply member in operative communication with the exhaust stream to be actuated thereby. The energy supply member transfers energy to the compressor member, the compressor member supplies a compressed fluid stream to the internal combustion engine. Moreover, the engine system includes an aftertreatment device in operative communication with the exhaust stream to treat the exhaust stream. The engine system additionally includes a bypass fluid system that bypasses the internal combustion engine and that includes an upstream end and a downstream end. The upstream end receives a portion of the compressed fluid stream from the compressor member, and the downstream end is in fluid communication with the exhaust fluid system downstream from the energy supply member. The bypass fluid system supplies the portion of the compressed fluid stream to the aftertreatment device.

In still another aspect, a method of directing flow through an engine system is disclosed. The engine system includes an internal combustion engine, an intake fluid system, an exhaust fluid system, a turbocharger device including a compressor member and an energy supply member, an aftertreatment device, and a bypass fluid system that bypasses the internal combustion engine. The method includes receiving an intake fluid stream via the intake fluid system, receiving an exhaust stream from the engine via the exhaust fluid system, and actuating the energy supply member of the turbocharger device via the exhaust stream. The method also includes transferring energy from the energy supply member to the compressor member so as to supply a compressed fluid stream to the internal combustion engine. Furthermore, the method includes providing the aftertreatment device in operative communication with the exhaust stream and receiving a portion of the compressed fluid stream via the bypass fluid system. Additionally, the method includes directing flow of the portion of the compressed fluid stream through the bypass fluid system downstream from the energy supply member and to the aftertreatment device.

In a further aspect, an engine system for a vehicle is disclosed. The engine system includes an internal combustion engine, an intake fluid system that receives an intake fluid stream, and an exhaust fluid system that receives an exhaust stream from the engine. The engine system also includes a turbocharger device including a compressor member in operative communication with the intake fluid stream and an energy supply member in operative communication with the exhaust stream to be actuated thereby. The energy supply member transfers energy to the compressor member, and the compressor member supplies a compressed fluid stream to the internal combustion engine. The engine system additionally includes a fluid cooler operatively coupled to the intake fluid system downstream of the compressor member to reduce a temperature of the compressed fluid stream. Moreover, the engine system includes an aftertreatment device in operative communication with the exhaust stream to treat the exhaust stream. The aftertreatment device includes a burner that reduces materials collected from the exhaust stream and/or a hydrocarbon injector that injects a hydrocarbon into the exhaust stream. The engine system further includes a controller and a bypass fluid system including an upstream end, a downstream end, and a bypass valve. The upstream end receives a portion of the compressed fluid stream from the turbocharger device, and the downstream end in fluid communication with the exhaust fluid system downstream from the energy supply member. The bypass fluid system supplies the portion of the compressed fluid stream to the aftertreatment device. Furthermore, the controller changes a configuration of the bypass valve to selectively change flow through the bypass fluid system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
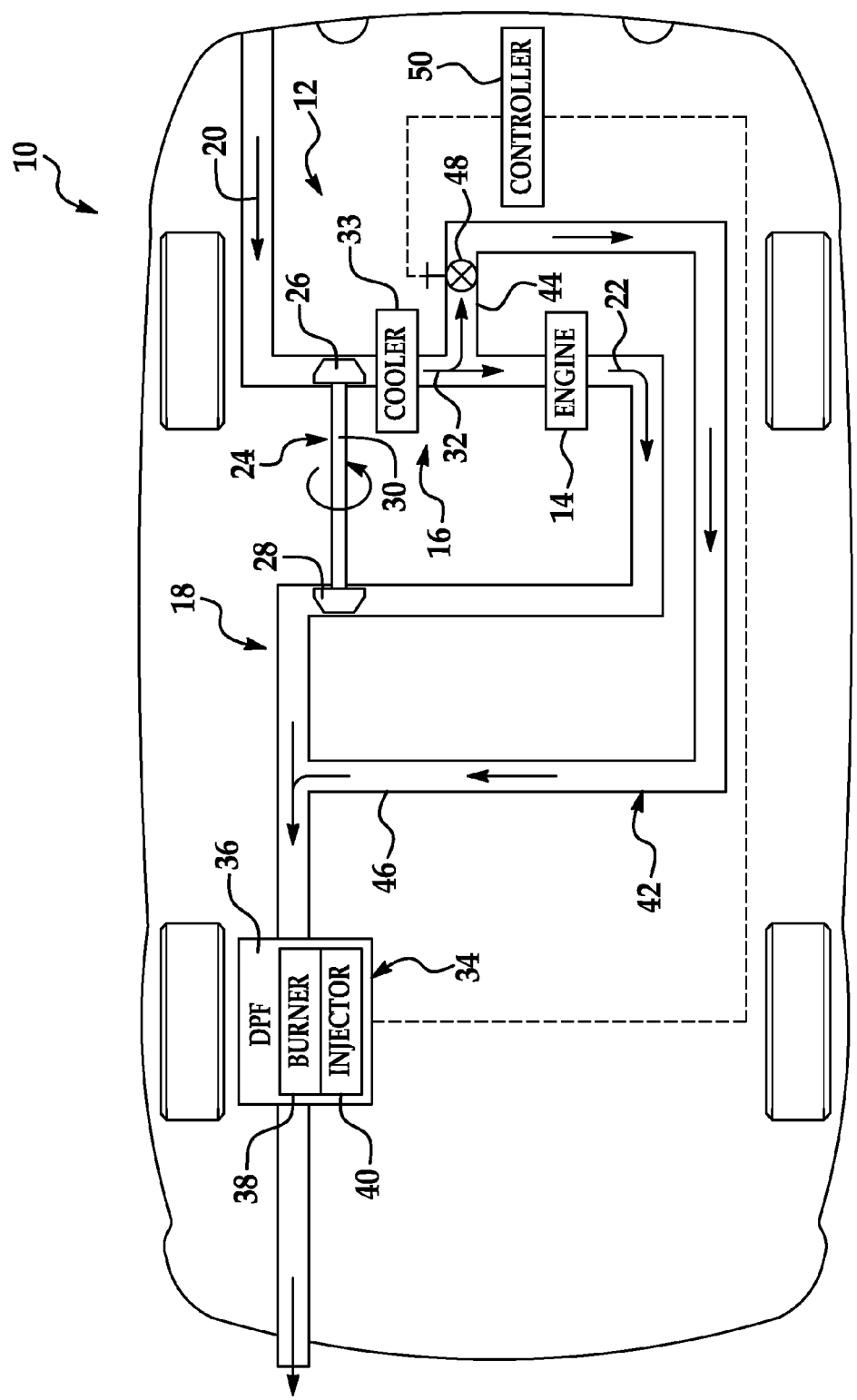
FIG. 1 is a schematic diagram of a vehicle having an engine system according to the teachings of the present disclosure.

The following description is merely exemplary in nature and is not intended to limit the present disclosure, application, or uses. It should be understood that throughout the drawings, corresponding reference numerals indicate like or corresponding parts and features.

Referring initially to FIG. 1, a vehicle 10 is illustrated having an engine system 12 according to various embodiments of the present disclosure. The engine system 12 includes an internal combustion engine 14. The internal combustion engine 14 can be of any suitable type, such as a diesel engine, a gasoline-powered engine, etc.

The engine system 12 further includes an intake fluid system, generally indicated at 16, and an exhaust fluid system, generally indicated at 18. As will be explained, the intake fluid system 16 generally receives an intake fluid stream 20 from outside the vehicle 10, and the exhaust fluid system 18 generally receives an exhaust stream 22 from the engine 14. In other words, the intake fluid stream 20 passes through the intake fluid system 16 to the engine 14. The engine 14 produces the exhaust stream 22 as a product of combustion of fuel, and the exhaust stream 22 flows through the exhaust fluid system 18 and is emitted from the vehicle 10. It will be appreciated that the intake and exhaust fluid system 16, 18 can include a plurality of hollow pipes, passages, and the like for directing flow of the respective fluids.

Furthermore, the engine system 12 includes a turbocharger device 24. The turbocharger device 24 can be of any suitable known type. In some embodiments, the turbocharger device 24 includes a compressor member 26, an energy supply member 28, and a coupling member 30. In some embodiments, the compressor member 26 is in operative communication with the intake fluid stream 20, and the energy supply member is in operative communication with the exhaust stream 22. More specifically, in some embodiments, the compressor member 26 is disposed within the intake fluid system 16, and the energy supply member 28 is disposed in the exhaust fluid system 18. The energy supply member 28 and the compressor member 26 can be fixed to the coupling member 30, and the turbocharger device 24 can be supported for rotation relative to the intake and exhaust fluid systems 16, 18. Additionally, the compressor member 26 and the energy supply member 28 can each include a plurality of fins. In operation, as the intake fluid stream 20 flows through the intake fluid system 16, the flow of the intake fluid stream is compressed by the compressor member 26, such that the compressor member 26 supplies a compressed fluid stream 32 to the engine 14. Also, flow of the exhaust stream 22 drivingly rotates the energy supply member 28, and this energy of rotation is transferred to the compressor member 26 via the coupling member 30. It will be appreciated that the turbocharger device 24 allows for a greater amount of air/fuel mixture to enter into the cylinders of the engine 14 to improve the efficiency of the engine 14.

The engine system 12 can also include a fluid cooler 33. The fluid cooler 33 can be operatively coupled to the intake fluid system 16 downstream of the compressor member 26 of the turbocharger device 24. In operation, the fluid cooler 33 reduces temperature of the compressed fluid stream 32 before entering the engine 14. It will be appreciated that the fluid cooler 33 can be of any suitable known type.

Additionally, the engine system 12 can include an aftertreatment device 34. The aftertreatment device 34 can be in operative communication with the exhaust stream 22. In other words, the aftertreatment device 34 can be in fluid communication with the exhaust stream 22 and disposed within the exhaust fluid system 18. It will be appreciated that the aftertreatment device 34 can be of any suitable type for receiving at least a portion of the exhaust stream 22 and treating the exhaust stream 22, such as a diesel particulate filter, a hydrocarbon injector, etc.

In some embodiments represented by FIG. 1, the aftertreatment device 34 includes a diesel particulate filter 36 that filters particulate (i.e., soot) from the exhaust stream 22 before the exhaust stream 22 is emitted from the vehicle 10. The diesel particulate filter 36 can also include a burner 38 and an injector 40. At predetermined times, the injector 40 injects fuel, and the burner 38 ignites the fuel injected from the injector 40, and the particulate matter collected by the diesel particulate filter 36 is reduced in a process known as "regeneration." However, it will be appreciated that the aftertreatment device 34 can be of any suitable type for treating (e.g., reducing undesirable matter) from the exhaust stream 22.

The engine system 12 additionally includes a bypass fluid system 42. Like the intake and exhaust fluid systems 16, 18, the bypass fluid system 42 can include a plurality of pipes, passages, etc. The bypass fluid system provides fluid communication between the intake fluid system 16 and the exhaust fluid system 18 and bypasses the internal combustion engine 14. Furthermore, the bypass fluid system 42 includes an upstream end 44 and a downstream end 46. The upstream end 44 receives a portion of the compressed fluid stream 32 from the compressor member 26 of the turbocharger device 24, and the downstream end 46 is in fluid communication with the exhaust fluid system 18 downstream from the energy supply member 28 of the turbocharger device 24. As will be explained, the bypass fluid system 42 supplies the aftertreatment device 34 with the portion of compressed fluid stream 32 from the intake fluid system 16.

The bypass fluid system 42 can include a bypass valve 48. The bypass valve 48 can be of any suitable type for selectively changing flow behavior through the bypass fluid system 42.

Also, the bypass valve 48 can be disposed in any suitable position relative to the bypass fluid system 42. The bypass fluid system 42 includes a bypass conduit that is uninterrupted between its downstream end 46 and bypass valve 48. The downstream end 46 of bypass fluid system 42 is joined together with an upstream end of a mixing tube. The downstream end of the mixing tube is coupled to the aftertreatment device 34. The mixing tube is uninterrupted between its upstream and downstream ends.

Moreover, the engine system 12 can include a controller 50. The controller 50 can include circuitry, programmed logic, computer memory, and the like for changing a configuration of the bypass valve 48 (e.g., changing the position of the valve 48). The controller 50 can be in communication with the bypass valve 48 and the aftertreatment device 34. As will be explained in greater detail, the controller 50 can change the configuration (e.g., the position) of the bypass valve 48 based on a predetermined operation schedule of the aftertreatment device 34.

Figure 2:
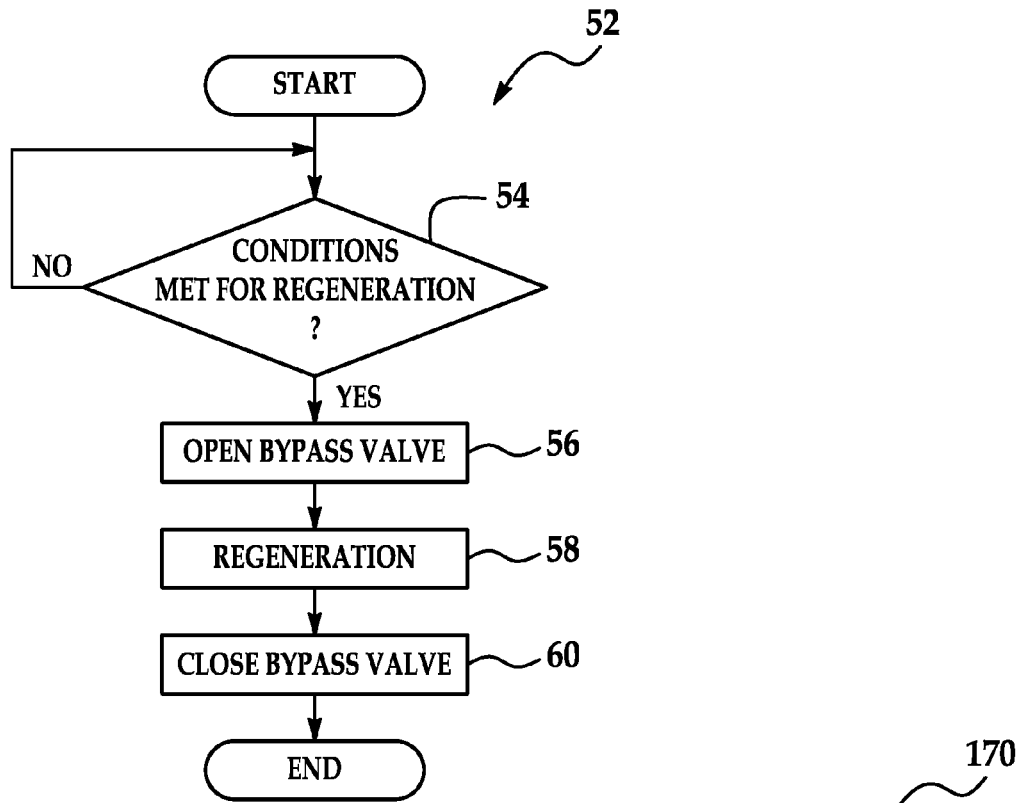
FIG. 2 is a flowchart illustrating a method of operating the engine system of FIG. 1.

Referring now to FIG. 2, a method 52 of operating the engine system 12 and directing fluid through the engine system 12 is illustrated. The method begins in decision block 54, wherein it is determined whether conditions are met for regeneration of the diesel particulate filter 36. In other words, decision block 54 involves determining whether the predetermined operation schedule calls for a regeneration of the diesel particulate filter 36. It will be appreciated that the predetermined operation schedule can call for regeneration under any suitable vehicle conditions. For instance, the predetermined operation schedule can call for regeneration after a certain amount of miles have been driven, once pressure detected downstream of the aftertreatment device 34 is above a predetermined threshold, or the like.

If decision block 54 is answered in the negative, the method 52 loops back to the start of the method 52. However, if decision block 54 is answered in the affirmative, step 56 follows.

In step 56, the controller 50 transmits a signal causing the bypass valve 48 to move from a substantially closed position to an open position to begin flow through the bypass fluid system 42 to the aftertreatment device 34.

Then, in step 58, regeneration of the diesel particulate filter 36 occurs. More specifically, the injector 40 injects a fuel into the fluid provided by the bypass fluid system 42, and the burner 38 ignites the air/fuel mixture to reduce particulate collected by the diesel particulate filter 36. It will be appreciated that the bypass fluid system 42 could provide fluid to the burner 38 in combination with the exhaust fluid system 18, or the bypass fluid system 42 could provide fluid to the burner 38 independent of the exhaust fluid system 18 to enable regeneration of the aftertreatment device 34.

Then, in step 60, the controller 50 transmits a signal, which causes the bypass valve 48 to move from the open position to the substantially closed position to substantially stop flow through the bypass fluid system 42. Accordingly, it will be appreciated that the controller 50 controls the configuration and position of the bypass valve 48 such that flow through the bypass fluid system 42 is intermittent and such that flow through the bypass fluid system 42 occurs according to the predetermined regeneration schedule of the diesel particulate filter 36.

It will also be appreciated that the upstream end 44 of the bypass fluid system 42 is downstream from the fluid cooler 33. As such, the compressed fluid stream 32 flowing through the bypass fluid system 42 is substantially cooled by the fluid cooler 33. Accordingly, overheating and malfunction of the injector 40 is less likely.

Figure 3:
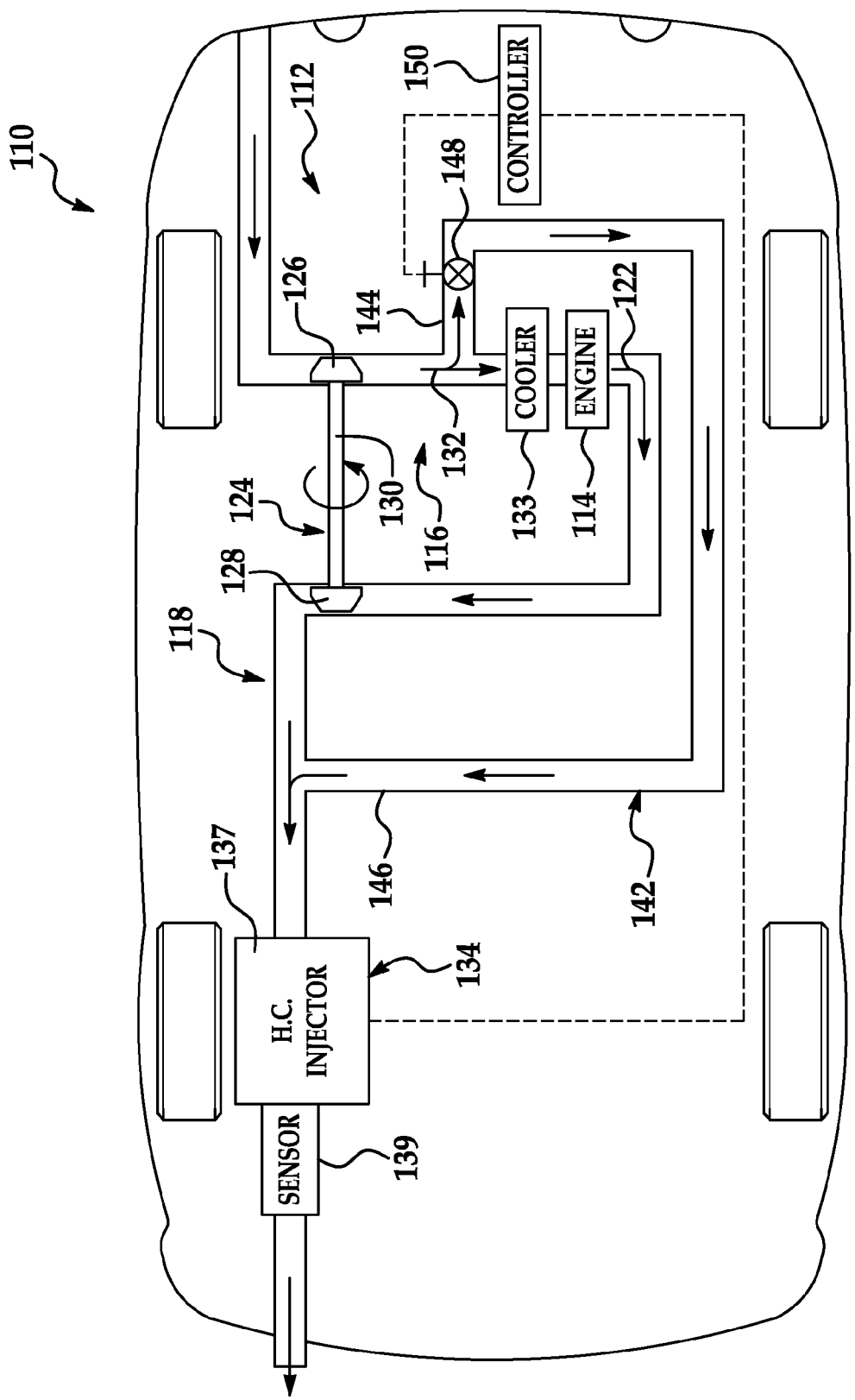
FIG. 3 is a schematic diagram of a vehicle with another embodiment of the engine system according to the teachings of the present disclosure.

Referring now to FIG. 3, an engine system 112 of a vehicle 110 according to various other embodiments of the present disclosure is illustrated. It will be appreciated that the engine system 112 is substantially similar to the engine system 12 of FIGS. 1 and 2. It will also be appreciated that like components are indicated with like numerals increased by 100.

The engine system 112 includes a bypass fluid system 142 with an upstream end 144 and a downstream end 146. The upstream end 144 of the bypass fluid system 142 is in fluid communication with the intake fluid system 116 upstream of the cooler 133.

Also, in some embodiments, the engine system 112 includes and aftertreatment device 134, such as a hydrocarbon injector 137 (e.g., flame reformer, urea injector). The hydrocarbon injector 137 can be of any suitable known type for injecting hydrocarbons into the exhaust stream 122 for reducing NOx emitted by the engine system 112.

Furthermore, the engine system 112 can include an emissions sensor 139 that detects an amount of an emission substance in the exhaust stream 122. It will be appreciated that the emissions sensor 139 can be of any suitable known type, such as an NOx sensor that detects an amount of NOx in the exhaust stream 122. The controller 150 is in communication with the bypass valve 148, the aftertreatment device 134, and the emissions sensor 139. As will be described below, the controller 150 changes the configuration (e.g., the position) of the bypass valve 148 based on the amount of the emissions detected by the emissions sensor 139.

Figure 4:
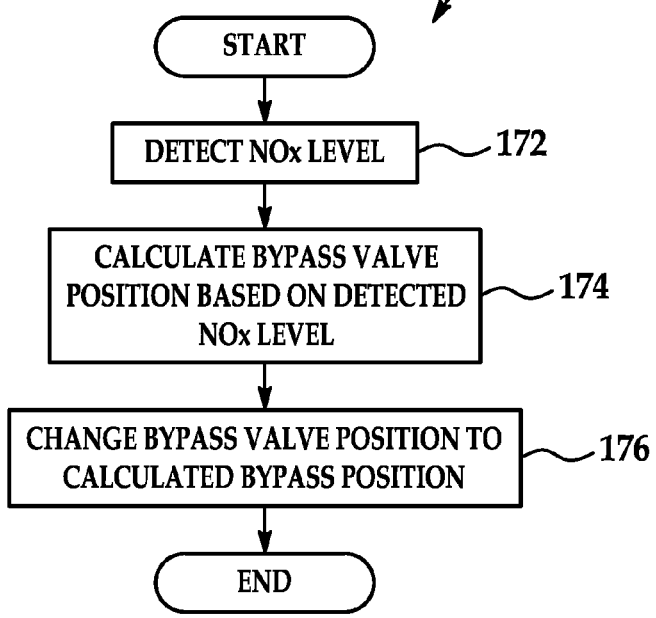
FIG. 4 is a flowchart illustrating a method of operating the engine system of FIG. 3.

Referring now to FIG. 4, a method 170 for controlling the engine system 112 and directing flow through the engine system 112 is illustrated. The method 170 begins in step 172, in which the emissions sensor 139 detects the level of NOx. Then, in step 172, the controller 150 calculates a desired position of the bypass valve 148 based on the level of NOx detected by the emissions sensor 139.

Next, in step 176, the controller 150 transmits a signal to change the position of the bypass valve 148 to match the desired position of the bypass valve 148 calculated in step 174. In some embodiments, the position of the bypass valve 148 is changed in step 176 between a partially closed position and a fully open position. As such, flow is maintained substantially continuous, but the flow rate is changed through the bypass fluid system 142 in step 176. In other words, flow rate through the bypass fluid system 142 varies as a function of the NOx output of the engine 114, and the emissions sensor 139 provides feedback to the bypass valve 148 to adjust the amount of fluid flow through the bypass valve 148 to the hydrocarbon injector 137.

In some embodiments represented in FIG. 3, the upstream end 144 of the bypass fluid system 142 is in fluid communication with the intake fluid system 116 upstream of the fluid cooler 133 and downstream of the compressor member 126 of the turbocharger device 124. In this case, fluid flowing through the bypass fluid system 142 is not cooled by the fluid cooler 133 for improved performance of the aftertreatment device 134.

Thus, the engine system 12, 112, includes a bypass fluid system 42, 142 for supplying air to the aftertreatment device 34, 134. It will be appreciated that the bypass fluid system 42, 142 supplies air to the aftertreatment device 34, 134 without the need of an independent air supply system or an air supply system that is driven by the engine 14, 114. Thus, the engine system 112 can be less complex, can include less components, can be easier to integrate into the vehicle 10, 110, and can improve efficiency as compared to prior art engine systems.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An exhaust treatment system for a vehicle that includes an internal combustion engine and a turbocharger having a compressor driven by an energy supply member, the exhaust treatment system comprising:
   an intake conduit adapted to receive pressurized intake air provided from the turbocharger compressor and supply the pressurized intake air to the internal combustion engine;
   a bypass conduit bypassing the internal combustion engine and including an upstream end in communication with the intake conduit;
   a bypass valve positioned within the bypass conduit to change the flow of compressed intake air through the bypass conduit;
   a mixing tube including upstream and downstream ends;
   an exhaust conduit having an upstream end adapted to receive exhaust from the internal combustion engine and a downstream end, wherein the exhaust conduit is adapted to receive the energy supply member at a location between the upstream and downstream ends, the downstream end of the exhaust conduit and a downstream end of the bypass conduit being joined together at the upstream end of the mixing tube, wherein the exhaust and pressurized intake air are mixed within the mixing tube;
   a burner coupled to the downstream end of the mixing tube to heat the mixed exhaust and pressurized intake air;
   an exhaust treatment device in receipt of a heated mixture of exhaust and pressurized intake air supplied from the burner; and
   a controller that changes a configuration of the bypass valve to selectively change flow through the bypass conduit wherein the controller changes the configuration of the bypass valve between a partially closed position and an open position so that flow through the bypass conduit is continuous.

2. The exhaust treatment system of claim 1, wherein the upstream end of the mixing tube, the downstream end of the bypass conduit, and the downstream end of the exhaust conduit are joined at a multi-tubular interconnection.

3. The exhaust treatment system of claim 2, wherein the bypass conduit is uninterrupted between its downstream end and the bypass valve.

4. The exhaust treatment system of claim 2, wherein the mixing tube is uninterrupted between its upstream and downstream ends.

* * * * *